US010395538B2

(12) United States Patent
Kumabe

(10) Patent No.: US 10,395,538 B2
(45) Date of Patent: *Aug. 27, 2019

(54) VEHICULAR COMMUNICATION DEVICE

(71) Applicant: DENSO CORPORATION, Kariya, Aichi-pref (JP)

(72) Inventor: Seigou Kumabe, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 45 days.

This patent is subject to a terminal disclaimer.

(21) Appl. No.: 15/545,846

(22) PCT Filed: Jan. 28, 2016

(86) PCT No.: PCT/JP2016/000437
§ 371 (c)(1),
(2) Date: Jul. 24, 2017

(87) PCT Pub. No.: WO2016/125469
PCT Pub. Date: Aug. 11, 2016

(65) Prior Publication Data
US 2018/0018876 A1 Jan. 18, 2018

(30) Foreign Application Priority Data
Feb. 3, 2015 (JP) ................. 2015-019510

(51) Int. Cl.
G08G 1/16 (2006.01)
G08G 1/01 (2006.01)
(Continued)

(52) U.S. Cl.
CPC ........... *G08G 1/163* (2013.01); *G08G 1/0112* (2013.01); *G08G 1/09675* (2013.01);
(Continued)

(58) Field of Classification Search
CPC .... G08G 1/161; G08G 1/096766; G08G 1/16; H04W 4/44; H04W 4/46; H04W 28/0236
See application file for complete search history.

(56) References Cited

U.S. PATENT DOCUMENTS

2006/0013172 A1* 1/2006 Ruuska ................ H04B 1/7143
370/338
2006/0183487 A1* 8/2006 Allen .................... H04W 4/021
455/456.5
(Continued)

FOREIGN PATENT DOCUMENTS

JP 2007048302 A 2/2007

OTHER PUBLICATIONS

U.S. Appl. No. 15/545,856, filed Jul. 24, 2017, Kumabe.
U.S. Appl. No. 15/545,829, filed Jul. 24, 2017, Kumabe.

*Primary Examiner* — Phung Nguyen
(74) *Attorney, Agent, or Firm* — Harness, Dickey & Pierce, P.L.C.

(57) ABSTRACT

A vehicular communication device is provided. The vehicular communication device includes a reception section that receives, from a periphery vehicle equipped with a narrow area communicator, a communication performance index representing performance of the narrow area communicator, and controller. The controller includes a reference value setup section that successively settles a reference value as a criterion for the communication performance index based on the communication performance indexes received from multiple periphery vehicles, an acquisition section that acquires the communication performance index for a targeted narrow area communicator serving as the narrow area communicator targeted at anomaly determination, and an anomaly determination section that determines an anomaly of the targeted narrow area communicator based on comparison between the reference value settled by the reference value (Continued)

setup section and the communication performance index acquired by the acquisition section for the targeted narrow area communicator.

8 Claims, 7 Drawing Sheets

(51) Int. Cl.
G08G 1/0967 (2006.01)
H04W 84/00 (2009.01)
H04W 84/18 (2009.01)
H04L 29/14 (2006.01)
H04W 4/40 (2018.01)
H04W 24/00 (2009.01)
H04W 4/80 (2018.01)

(52) U.S. Cl.
CPC . *G08G 1/096716* (2013.01); *G08G 1/096741* (2013.01); *G08G 1/096791* (2013.01); *H04L 69/40* (2013.01); *H04W 4/40* (2018.02); *H04W 84/005* (2013.01); *H04W 84/18* (2013.01); *B60W 2550/408* (2013.01); *H04W 4/80* (2018.02); *H04W 24/00* (2013.01)

(56) References Cited

U.S. PATENT DOCUMENTS

2010/0256852 A1* 10/2010 Mudalige ............... G08G 1/163
701/24
2013/0083674 A1* 4/2013 Jain ....................... H04W 84/18
370/252
2014/0269278 A1* 9/2014 Alexander ............. H04L 51/38
370/230

* cited by examiner

VEHICULAR COMMUNICATION DEVICE

CROSS REFERENCE TO RELATED APPLICATIONS

This application is a U.S. National Phase Application under 35 U.S.C. 371 of International Application No. PCT/JP2016/000437 filed on Jan. 28, 2016 and published in Japanese as WO 2016/125469 A1 on Aug. 11, 2016. This application is based on and claims the benefit of priority from Japanese Patent Application No. 2015-019510 filed on Feb. 3, 2015. The entire disclosures of all of the above applications are incorporated herein by reference.

TECHNICAL FIELD

The present disclosure relates to a vehicular communication device that determines an anomaly of a narrow area communicator.

BACKGROUND ART

Conventionally, there is known a technology that detects anomaly occurring on a device used for vehicles. Patent Literature 1 discloses the technology that uses a shock sensor included in an in-vehicle device to detect anomaly occurring on the in-vehicle device, for example.

Conventionally, there is known a system in which a vehicular communication device includes a narrow area communicator and performs wireless communication with vehicular communication devices mounted on other vehicles or with roadside devices by using the narrow area communicator so that a driver of the subject vehicle can receive various services (hereinafter referred to as in-vehicle communication services). There is known an example system in which the vehicular communication device transmits a position of a subject vehicle, namely, a vehicle using the vehicular communication device, to another vehicular communication device or a roadside device, and thereby provides a driver of the subject vehicle with an in-vehicle communication service corresponding to the subject vehicle position.

PRIOR ART LITERATURES

Patent Literature

Patent Literature 1: JP 2007-48302 A

SUMMARY OF INVENTION

A driver cannot appropriately receive the above-mentioned interior communication service if the narrow area communicator included in the vehicular communication device is abnormal. It is therefore necessary to determine an anomaly of the narrow area communicator.

The narrow area communicator may be determined to be abnormal when communication performance of the narrow area communicator degrades. However, the communication environment of the narrow area communicator dynamically changes because the vehicular communication device is used for a vehicle acting as a mobile object. Communication performance of the narrow area communicator included in the vehicular communication device degrades due to positions or sizes of surrounding buildings or the number of periphery vehicles mounted with the vehicular communication device, for example. It has been therefore difficult to accurately determine an anomaly on the narrow area communicator based only on the communication performance of the narrow area communicator.

In consideration of the foregoing, it is an object of the invention to provide a vehicular communication device capable of accurately determining an anomaly on a narrow area communicator.

A vehicular communication device used for a vehicle in an aspect of the present disclosure comprises: a reception section that receives, from a periphery vehicle equipped with a narrow area communicator, a communication performance index representing performance of the narrow area communicator; a reference value setup section that successively settles a reference value as a criterion for the communication performance index based on the communication performance indexes received by the reception section from a plurality of the periphery vehicles; an acquisition section that acquires the communication performance index for a targeted narrow area communicator, wherein the targeted narrow area communicator is the narrow area communicator targeted at anomaly determination; and an anomaly determination section that determines an anomaly of the targeted narrow area communicator based on comparison between the reference value settled by the reference value setup section and the communication performance index acquired by the acquisition section for the targeted narrow area communicator.

In the vehicular communication device, a reference value setup section settles a reference value from communication performance indexes acquired from multiple periphery vehicles. The periphery vehicles share a similar communication environment with each other. The communication performance of targeted narrow area communicator may vary with the influence of the communication environment. In such a case, the reference value also varies with the communication environment.

The anomaly determination on the targeted narrow area communicator is performed based on comparison between the reference value and the communication performance index for the targeted narrow area communicator. It is possible to accurately distinguish between the case where the communication performance index for the targeted narrow area communicator is abnormal due to an anomaly of the targeted narrow area communicator and the case where the targeted narrow area communicator is not abnormal but the communication performance index for the targeted narrow area communicator indicates an abnormal value. Anomaly of the targeted narrow area communicator can therefore be determined accurately.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

<First Embodiment>

(Overall Configuration of a Communication System 1)

Figure 1:
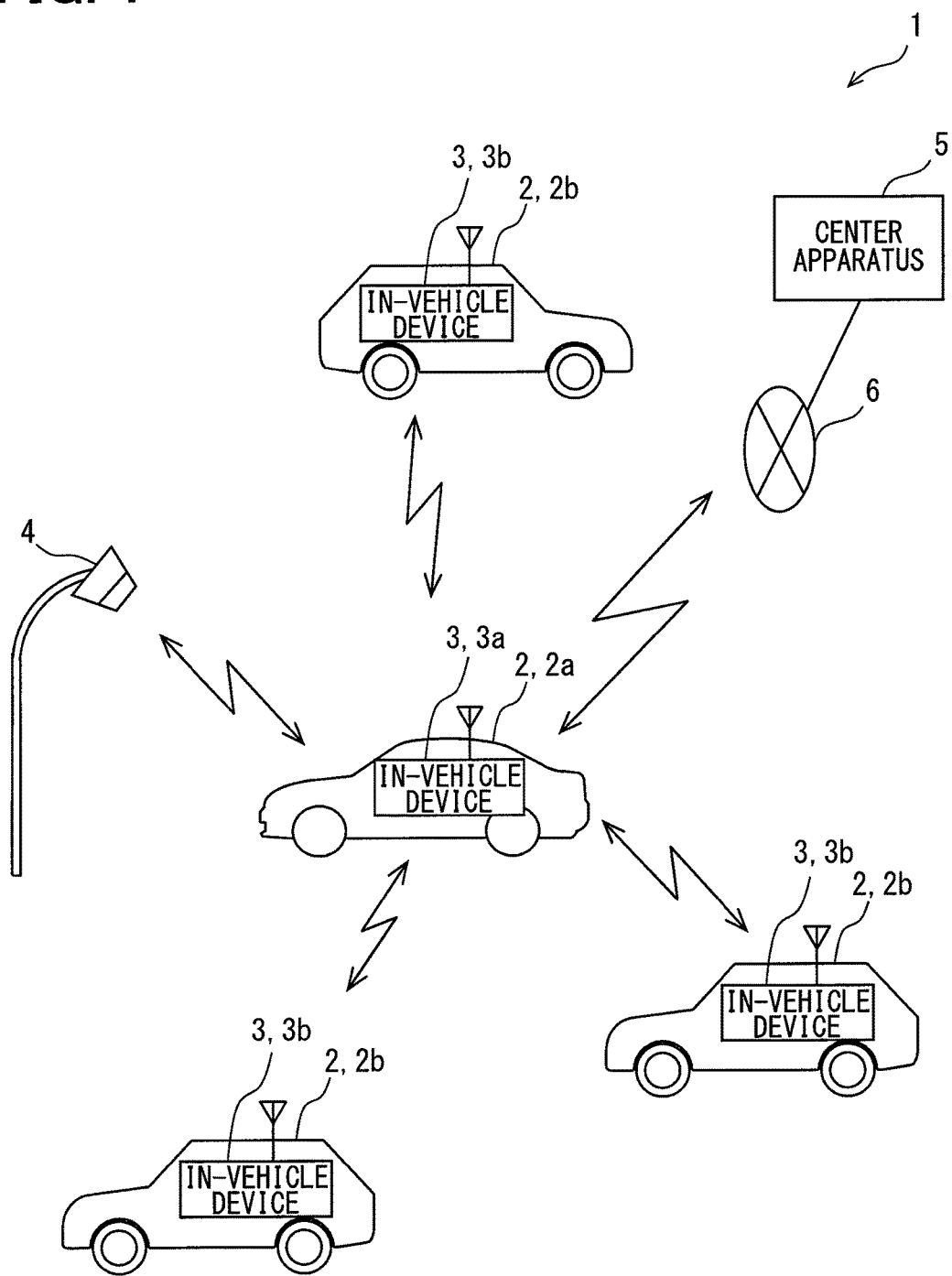
FIG. 1 illustrates an overall configuration of a communication system according to a first embodiment.

An embodiment will be described with reference to the accompanying drawings. A communication system 1 as illustrated in FIG. 1 includes: an in-vehicle device 3a used for a subject vehicle 2a; an in-vehicle device 3b used for a periphery vehicle 2b located in the vicinity of the subject vehicle 2a; a roadside device 4 installed at a roadside; and a center apparatus (hereinafter referred to as a center) 5.

The in-vehicle device 3a and the in-vehicle device 3b use the same configuration in the embodiment. Therefore, the distinguishing the subject vehicle 2a and the periphery vehicle 2b is for convenience sake. Any of the vehicles 2 can be the subject vehicle 2a. The periphery vehicle 2b is assumed to be the vehicle 2 that exists in the vicinity of the subject vehicle 2a and uses the in-vehicle device 3. In the description below, the nomenclature of vehicle 2 is simply used when the subject vehicle 2a and the periphery vehicle 2b are not distinguished. The nomenclature of in-vehicle device 3 is simply used when the in-vehicle device 3a and the in-vehicle device 3b are not distinguished. The in-vehicle device 3 corresponds to a vehicular communication device.

The in-vehicle device 3a and the in-vehicle device 3b transmit and receive information by using inter-vehicle communication, namely, wireless communication without using a communication network. The inter-vehicle communication covers a communication range of several hundreds of meters. The in-vehicle device 3 and the roadside device 4 transmit and receive information by using vehicle roadside communication, namely, wireless communication without using a communication network. The in-vehicle device 3 and the center 5 perform wide area communication via a wide area communication network 6.

The roadside device 4 performs the vehicle roadside communication with the in-vehicle device 3 to exchange information about service provision when the in-vehicle device 3 is used for the vehicle 2 that is located in a wireless communication area for the roadside device 4. The wireless communication area for the roadside device 4 can be variously changed depending on service types. The wireless communication area approximates to several tens to hundreds of meters from the roadside device 4, for example.

A center 5 is provided as a server and receives information that is transmitted from an in-vehicle device 3 by using wide area communication. The notification includes anomaly notification from a narrow area communicator 31 (see FIG. 2) included in the in-vehicle device 3. The information also includes payment information. The payment information is used for a vehicle 2 to pay a fee when using a road facility. The road facility includes a toll road and a paid road capable of parking at the roadside. The road facility moreover includes a pay parking lot. The center 5 receives the payment information and, based on the payment information, performs a charging process that charges a fee resulting from using the road facility.

(Configuration of the In-Vehicle Device 3)

The configuration of the in-vehicle device 3 will be described. The description below about FIGS. 2 through 5 explains the configuration of the in-vehicle device 3a mounted on the subject vehicle 2a. As above, however, the same configuration is used for the in-vehicle device 3a mounted on the subject vehicle 2a and the in-vehicle device 3b mounted on the periphery vehicle 2b.

The in-vehicle device 3a may be fixed to a member included in the subject vehicle 2a by using a bolt or an adhesive so that the in-vehicle device 3a can hardly be brought out of the subject vehicle 2a. Alternatively, the in-vehicle device 3a may be mounted on the subject vehicle 2a by being fixed to a holder so that the in-vehicle device 3a can be detached from the holder without using a tool. The in-vehicle device 3a is assumed to be normally mounted on the subject vehicle 2a at a dashboard facing a windshield.

Figure 2:
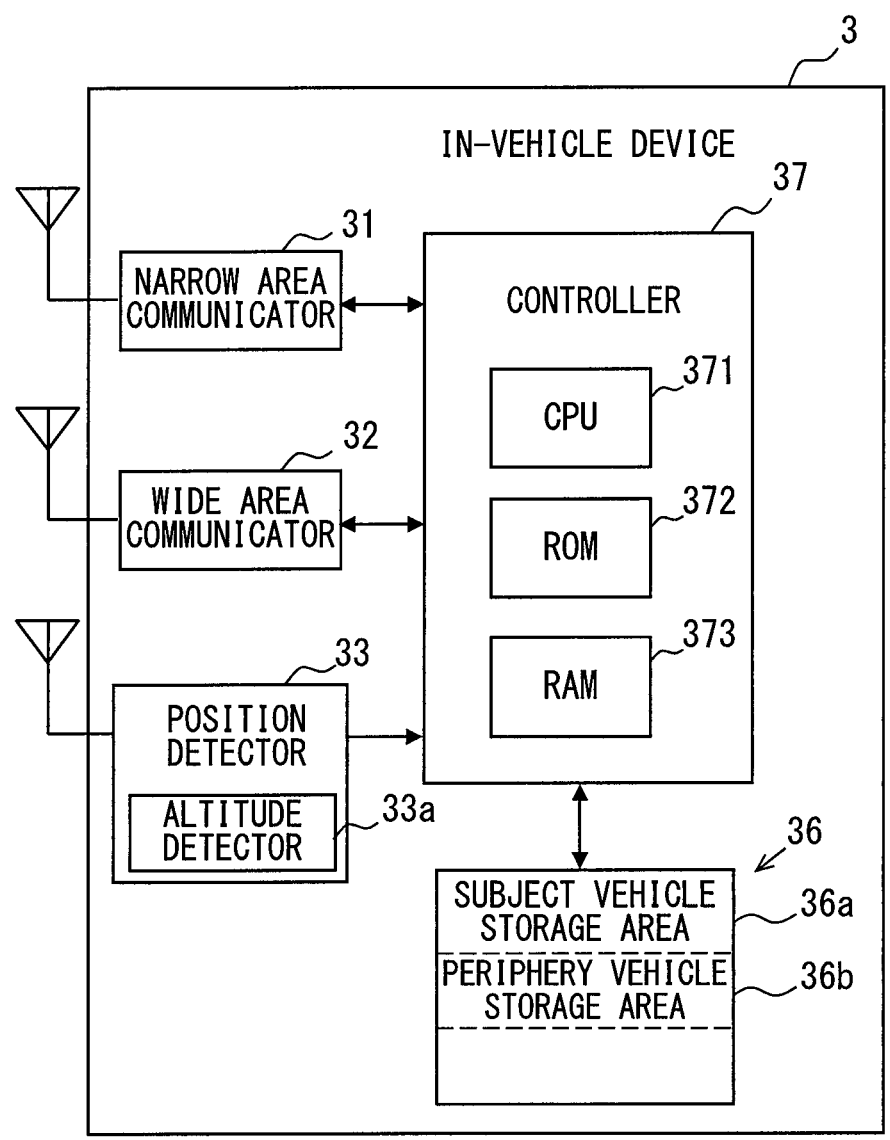
FIG. 2 is a block diagram illustrating a configuration of an in-vehicle device in FIG. 1.

As illustrated in FIG. 2, the in-vehicle device 3 includes a narrow area communicator 31, a wide area communicator 32, a position detector 33, a storage unit 36, and a controller 37.

The narrow area communicator 31 can be also referred to as an inter-vehicle communicator or a vehicle roadside communicator and communicates with the outside of a subject vehicle 2a by using inter-vehicle communication and vehicle roadside communication. The narrow area communicator 31 covers a communication range comparable to a radius of approximately several hundreds of meters. The narrow area communicator 31 communicates with the in-vehicle device 3b mounted on a periphery vehicle 2b and with a roadside device 4. The narrow area communicator 31 serves as a receiver to receive a communication performance index for the narrow area communicator 31 included in the in-vehicle device 3b from the in-vehicle device 3b of the periphery vehicle 2b.

The vicinity in the embodiment signifies the communication range of the narrow area communicator 31. The narrow area communicator 31 modulates and demodulates a received signal and outputs demodulated data to the controller 37. The narrow area communicator 31 modulates data input from the controller 37, converts the data into an electromagnetic wave, and transmits it.

The narrow area communicator 31 specifies any one of an RSSI (Received Signal Strength Indication), an average communication rate, a communication success rate, and the number of received error frames as a communication performance index. The communication performance index is predetermined to represent which of these. The communication performance index represents the same one for the different in-vehicle devices 3.

The RSSI is specified based on the electric power of a received electromagnetic wave. The average communication rate is specified based on the quantity of data received during a specified time. The communication success rate is calculated from the number of frames received during a given time period and the number of successfully decoded frames. The number of received error frames provides the number of frames resulting in errors during a specified time, namely, the number of unsuccessfully decoded frames. The narrow area communicator 31 also outputs the specified communication performance index to the controller 37.

The wide area communicator 32 connects with the wide area communication network 6 to communicate with the center 5 outside the subject vehicle 2a, for example. The wide area communicator 32 demodulates a signal received via the wide area communication network 6 and outputs the signal to the controller 37. The wide area communicator 32 modulates a signal input from the controller 37 and transmits the signal to the center 5.

The position detector 33 includes a GNSS receiver used for GNSS (Global Navigation Satellite System) and successively detects a current position of the subject vehicle 2a based on a positioning signal received from a positioning satellite. The position detector 33 is therefore a subject vehicle position specifier. The current position is represented in latitude, longitude, and altitude. The position detector 33 detects the altitude and therefore also provides a function as an altitude detector 33a. The position detector 33 successively (e.g., every 100 milliseconds) outputs the detected current position to the controller 37.

The controller 37 is provided as a typical computer including a CPU 371, ROM 372, and RAM 373. The ROM 372 stores a control program. The CPU 371 executes the control program stored in the ROM 372 by using a temporary storage function of the RAM 373. The controller 37 thereby performs processes illustrated in FIGS. 3 through 5. All or part of the functions performed by the controller 37 may be configured as hardware by using one or more IC modules.

The storage unit 36 is writable and includes a subject vehicle storage area 36a and a periphery vehicle storage area 36b. RAM 373 may be used as the storage unit 36.

(Processes of the Controller 37)

Figure 3:
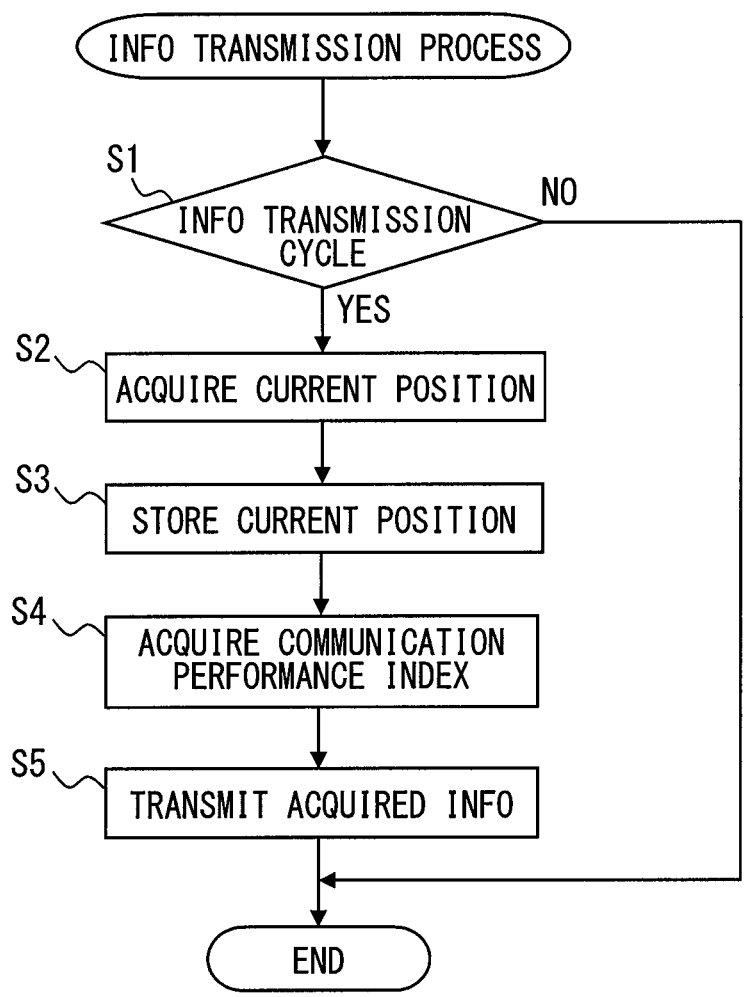
FIG. 3 is a flowchart illustrating an information transmission process performed by a controller in FIG. 2.
Figure 4:
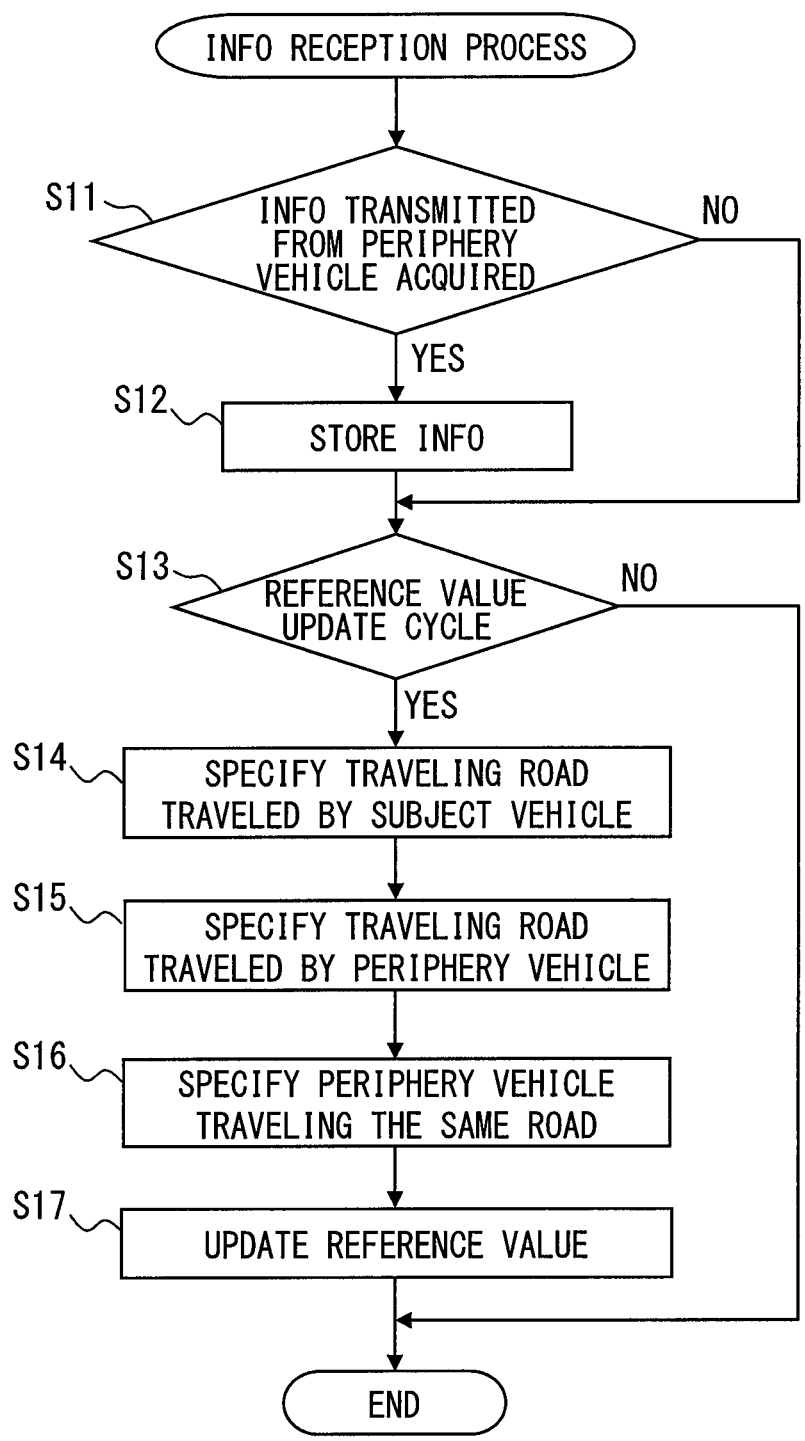
FIG. 4 is a flowchart illustrating an information reception process performed by the controller in FIG. 2.
Figure 5:
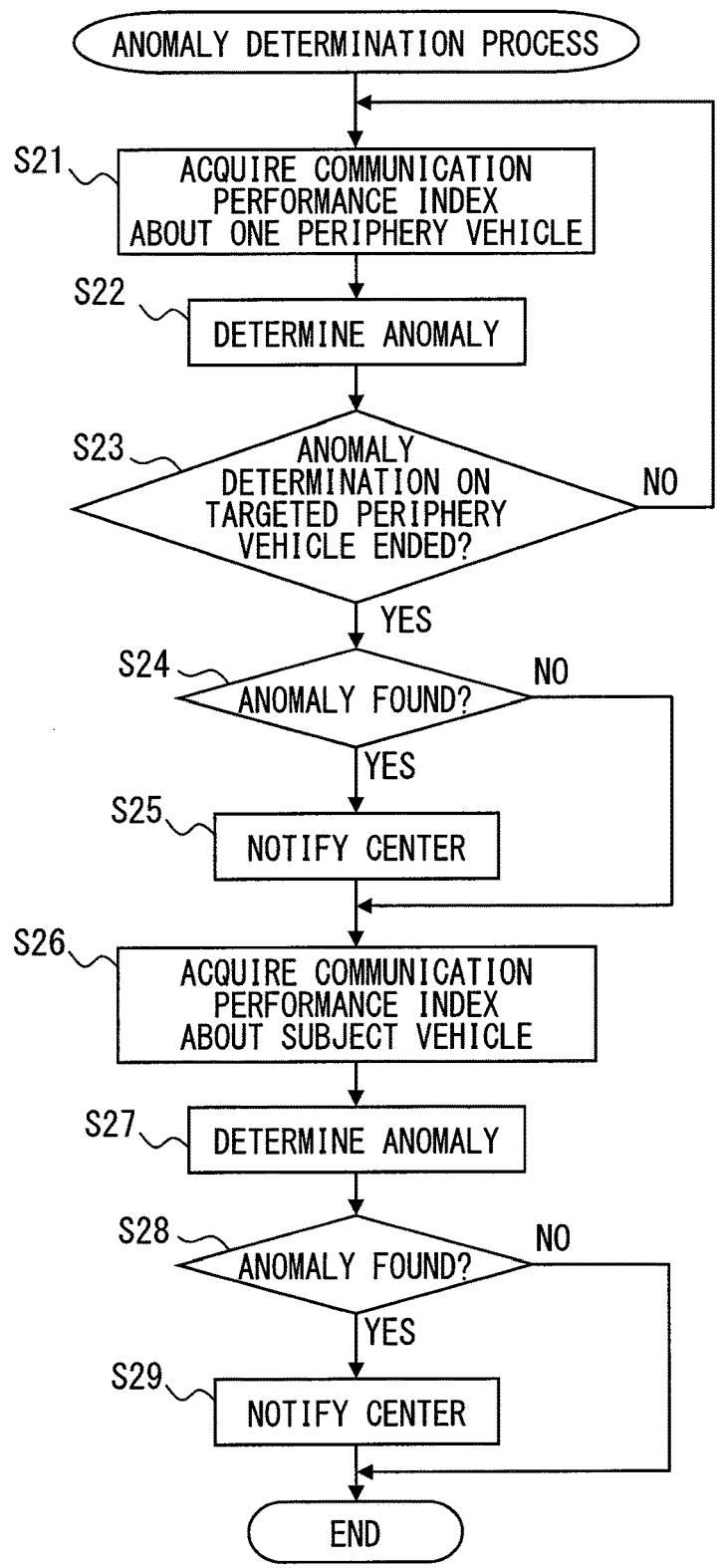
FIG. 5 is a flowchart illustrating an anomaly determination process performed by the controller in FIG. 2.

The controller 37, when powered on, performs processes illustrated in FIGS. 3 through 5 each at a corresponding predetermined cycle. The description below first explains an information transmission process in FIG. 3.

At step S1, it is determined whether an information transmission cycle is reached. The information transmission cycle ranges from one to several hundreds of milliseconds. The process in FIG. 3 terminates if the determination at step S1 results in NO. The process proceeds to step S2 if the determination results in YES.

At step S2, the current position is acquired from the position detector 33. At step S3, the current position acquired at step S2 is stored in the subject vehicle storage area 36a of the storage unit 36. The current position stored here is used to specify a traveling road for the subject vehicle 2a. Specification of the traveling road uses a history of current positions corresponding to a given time period. Current positions before the given time period is unnecessary. Step S3 therefore stores the most recent current position and deletes existing current positions that are stored before a lapse of the given time period. The given time period is predetermined at any value.

At step S4, the most recent communication performance index for the narrow area communicator 31 of the subject vehicle 2a is acquired from the subject vehicle storage area 36a of the storage unit 36. The communication performance index is stored in the subject vehicle storage area 36a of the storage unit 36 at step S12 in FIG. 4 to be described later.

At step S5, the narrow area communicator 31 transmits the current position acquired at step S2 and the communication performance index acquired at step S4 along with the vehicle ID of the subject vehicle 2a around the subject vehicle 2a. The vehicle ID of the subject vehicle 2a is stored in a given storage unit such as ROM 372. An ID of the in-vehicle device 3a can be used as the vehicle ID of the subject vehicle 2a. The narrow area communicator 31 uses a broadcast system as a transmission system, for example. However, the transmission system may use a unicast or multicast system that specifies the periphery vehicle 2b as an information transmission destination.

The description below explains an information reception process illustrated in FIG. 4. At step S11, it is determined whether information transmitted from the in-vehicle device 3b mounted on the periphery vehicle 2b is acquired. Specifically, the periphery vehicle 2b performs step S5 in FIG. 3 as above and the narrow area communicator 31 of the in-vehicle device 3a receives the information. The narrow area communicator 31 then supplies the decoded data as above. At step S11, it is determined whether the decoded data is supplied from the narrow area communicator 31. The process directly proceeds to step S13 if the determination results in NO. The process proceeds to step S12 if the determination results in YES.

At step S12, the information acquired from the narrow area communicator 31 is stored in the storage unit 36 along with the storing time point. The information acquired from the narrow area communicator 31 includes the communication performance index specified by the narrow area communicator 31 of the subject vehicle 2a as above in addition to the information transmitted from the periphery vehicle 2b. At step S12, the information transmitted from the periphery vehicle 2b is stored in the periphery vehicle storage area 36b and the communication performance index specified by the narrow area communicator 31 of the subject vehicle 2a is stored in the subject vehicle storage area 36a. The most recent information acquired from the narrow area communicator 31 is stored in the subject vehicle storage area 36a and the periphery vehicle storage area 36b and the existing information that is stored before a lapse of the given time period is deleted. The given time period may equal that described at step S3.

The type of information transmitted by the subject vehicle 2a equals the type of information transmitted by the subject vehicle 2a at step S5 in FIG. 3. The information transmitted by the periphery vehicle 2b therefore includes the current position of the periphery vehicle 2b, the communication performance index of the narrow area communicator 31 included in the in-vehicle device 3b of the periphery vehicle 2b, and the vehicle ID of the periphery vehicle 2b.

At step S13, it is determined whether a reference value update cycle is reached. The reference value update cycle is predetermined and takes effect longer than or equal to the information transmission cycle. The process in FIG. 4 terminates if the determination results in NO. The process proceeds to step S14 if the determination results in YES.

Steps S14 through S16 correspond to a traveling road specifier section. At step S14, a traveling road the subject vehicle 2a currently travels is specified. Specification of a traveling road for the subject vehicle 2a uses the current position stored in the subject vehicle storage area 36a of the storage unit 36. The subject vehicle storage area 36a stores multiple current positions acquired during a given time period. These current positions are connected to form a travel trajectory that can be assumed to be the traveling road for the subject vehicle 2a. A given width of line segment including the travel trajectory may be assumed to the traveling road for the subject vehicle 2a.

At step S15, the traveling road currently traveled by the periphery vehicle 2b is specified for each of periphery vehicles 2b. Specification of the traveling road for the periphery vehicle 2b uses the current position stored in the periphery vehicle storage area 36b of the storage unit 36. The periphery vehicle storage area 36b stores multiple current positions acquired from the multiple periphery vehicles 2b during a given time period and also stores the vehicle ID of the periphery vehicle 2b. Multiple current positions can be therefore acquired from the periphery vehicle storage area 36b for each of the periphery vehicles 2b. A traveling road is specified for each periphery vehicle 2b from multiple current positions acquired for the periphery vehicles 2b similarly to step S14.

At step S16, the periphery vehicle 2b traveling the same road as the subject vehicle 2a is specified by using the results specified at steps S14 and S15. Specifically, it is determined whether an angle (hereinafter referred to as a relative angle) between the traveling road specified at step S15 for each periphery vehicle 2b and the traveling road specified at step S14 for the subject vehicle 2a is smaller than or equal to a predetermined given angle (e.g., 30 degrees). The periphery vehicle 2b causing the relative angle to be smaller than or equal to the given angle is identified with a candidate for the periphery vehicle 2b traveling the same road as the subject vehicle 2a. The traveling road for the periphery vehicle 2b as a candidate is compared with an altitude difference between the subject vehicle 2a and the traveling road. The subject vehicle 2a is removed from candidates if the subject vehicle 2a causes the altitude difference to exceed an approximate altitude range that distinguishes a road corresponding to the earth from an elevated highway. A candidate for the remaining periphery vehicle 2b is specified as the periphery vehicle 2b that travels the same road as the subject vehicle 2a.

The following step S17 and the above-mentioned step S13 correspond to a reference value setup section. At step S17, the reference value is updated in terms of the periphery vehicle 2b, specified at step S16, traveling the same road as the subject vehicle 2a based on a reference value generation set, namely, the most recent communication performance index stored in the periphery vehicle storage area 36b. The reference value generation set may include the given number of communication performance indexes from the most recent one in addition to the most recent communication performance index. The reference value generation set may include communication performance indexes corresponding to a given time period from the most recent one.

The number of reference value generation sets may be smaller than the minimum number of reference value generation sets to ensure the reliability of reference values if the communication performance index included in the reference value generation set is limited to the communication performance index acquired from the periphery vehicle 2b traveling the same road. In such a case, the reference value generation set includes communication performance indexes stored in the periphery vehicle storage area 36b in terms of all the periphery vehicles 2b, not limited to the periphery vehicle 2b traveling the same road. Obviously, the minimum number is 2 or larger. Specifically, any numeric values are available. The reference value generation set may include the communication performance index for the subject vehicle 2a.

No reference value is specified when the in-vehicle device 3a is powered. Thus, when step S17 is performed for the first time after the power on of the in-vehicle device 3a, a reference value is specified, not updated.

A specific reference value generated from the reference value generation set uses any one of an average value, a median value, and a mode value for communication performance indexes included in the reference value generation set. The reference value is used to determine an anomaly in the narrow area communicator 31 during an anomaly determination process to be described next.

The description below explains an anomaly determination process illustrated in FIG. 5. At step S21 as an acquisition section, the most recent communication performance index corresponding to the narrow area communicator 31 of the periphery vehicle 2b targeted at the anomaly determination is acquired from the periphery vehicle storage area 36b of the storage unit 36.

A targeted narrow area communicator represents the narrow area communicator 31 of the periphery vehicle 2b when the narrow area communicator 31 is targeted at the anomaly determination. The narrow area communicator 31 of the periphery vehicle 2b targeted at the anomaly determination equals at least one of narrow area communicators 31 for which the reference value generation set includes the communication performance index. In the description below, the narrow area communicators 31 for which the reference value generation set includes the communication performance index are all assumed to be targeted narrow area communicators.

At step S22 as an anomaly determination section, the communication performance index acquired at step S21 is compared with the reference value to determine whether the narrow area communicator 31 corresponding to the communication performance index acquired at step S21 is abnormal. The process determines the narrow area communicator 31 of the periphery vehicle 2b transmitting the communication performance index to be abnormal when an anomaly determination condition is satisfied as a result of the comparison between the communication performance index acquired at step S21 and the reference value. The anomaly determination condition is satisfied when a difference between the reference value and the communication performance index is larger than an anomaly determination threshold value predetermined for the difference, for example. The anomaly determination condition may be satisfied when a ratio between the reference value and the communication performance index exceeds an anomaly determination range predetermined for the ratio.

At step S23, it is determined whether the anomaly determination on the targeted narrow area communicator 31 of the periphery vehicle 2b terminates. The process returns to step S21 if the determination results in NO. At step S21, in this case, the communication performance index is acquired from the periphery vehicle storage area 36b of the storage unit 36 on condition that the communication performance index corresponds to the narrow area communicator 31 of the periphery vehicle 2b on which the anomaly determination is not yet performed.

The process proceeds to step S24 if the determination at step S23 results in YES. At step S24, it is determined whether the repetition from steps S21 through S23 determines the narrow area communicator 31 of the periphery vehicle 2b to be abnormal. The process proceeds to step S26 if the determination results in NO. The process proceeds to step S25 if the determination results in YES.

At step S25 as a first anomaly notification processing section, the wide area communicator 32 notifies the center 5 of the vehicle ID of the periphery vehicle 2b including the narrow area communicator 31 determined to be abnormal along with a message signifying that the narrow area communicator 31 is abnormal. Repeated notification is unneeded if the same contents are already notified to the center 5. Repeated notification is unneeded if the same contents are already notified to the center 5. The wide area communicator 32 corresponds to a specified communicator.

At step S26 as the acquisition section, the targeted narrow area communicator is identified with the narrow area communicator 31 of the subject vehicle 2a. The most recent communication performance index for the narrow area communicator 31 of the subject vehicle 2a is acquired from the subject vehicle storage area 36a of the storage unit 36.

At step S27 as the anomaly determination section, the communication performance index acquired at step S26 is compared with the reference value and it is determined whether the narrow area communicator 31 of the subject vehicle 2a is abnormal. The anomaly determination uses the same method as step S22.

At step S28, it is determined whether the narrow area communicator 31 of the subject vehicle 2a is determined to be abnormal as a result of the anomaly determination at step S27. The process in FIG. 5 terminates if the determination results in NO. The process proceeds to step S29 if the determination results in YES.

At step S29 as a second anomaly notification processing section, the wide area communicator 32 notifies the center 5 of the vehicle ID of the subject vehicle 2a along with a message signifying that the narrow area communicator 31 is determined to be abnormal. Repeated notification is unneeded if the same contents are already notified to the center 5.

(Overview of the First Embodiment)

In the configuration of the first embodiment, the reference value at step S17 is settled from the communication performance index acquired from the periphery vehicle 2b that, out of the periphery vehicles 2b existing in the communication range for the narrow area communicator 31 of the subject vehicle 2a, travels the same road as the subject vehicle 2a (S14 through S17). Normally, multiple periphery vehicles 2b travel the same road as the subject vehicle 2a. The reference value is therefore settled from communication performance indexes acquired from the multiple periphery vehicles 2b.

The communication performance of the narrow area communicator 31 dynamically varies with positions or sizes of surrounding buildings or the number of vehicles 2 per unit area mounted with the in-vehicle device 3. However, the multiple periphery vehicles 2b similarly share positions or sizes of surrounding buildings or the number of vehicles 2 per unit area mounted with the in-vehicle device 3. The periphery vehicles 2b therefore share the similar communication environment with each other. An influence of the communication environment may change the communication performance of the targeted narrow area communicator. In such a case, an influence of the communication environment also changes the reference value settled based on communication performance indexes acquired from multiple periphery vehicles 2b. Even if the narrow area communicator 31 is abnormal, the anomaly exercises little influence on the reference value because multiple communication performance indexes are used. The reference value is therefore assumed to vary with the communication environment.

The reference value is compared with communication performance index for the narrow area communicator 31 to determine an anomaly in the narrow area communicator 31 of the periphery vehicle 2b (S22). A difference between the reference value and the communication performance index is therefore large when the communication performance index for the narrow area communicator 31 of the periphery vehicle 2b indicates an abnormal value due to an anomaly of the narrow area communicator 31. A difference between the reference value and the communication performance index is not so large when the narrow area communicator 31 of the periphery vehicle 2b is not abnormal but the communication performance index indicates an abnormal value due to an influence of the communication environment.

It is possible to accurately distinguish between the case where the narrow area communicator 31 of the periphery vehicle 2b is abnormal and the case where an influence of the communication environment causes an abnormal value from the communication performance index for the narrow area communicator 31. It is therefore possible to accurately determine an anomaly of the narrow area communicator 31 of the periphery vehicle 2b.

The reference value is also used to determine an anomaly of the narrow area communicator 31 of the subject vehicle 2a. Anomaly on the narrow area communicator 31 of the subject vehicle 2a is determined by comparing the reference value with the communication performance index for narrow area communicator 31 of the subject vehicle 2a (S27). It is possible to accurately distinguish between the case where the narrow area communicator 31 of the subject vehicle 2a is abnormal and the case where an influence of the communication environment causes an abnormal value from the communication performance index for the narrow area communicator 31 for the same reason as the above-mentioned anomaly determination on the narrow area communicator 31 of the periphery vehicle 2b. It is therefore possible to accurately determine an anomaly of the narrow area communicator 31 of the subject vehicle 2a.

Particularly, in the embodiment, the communication performance index used to specify the reference value is limited to the communication performance index received from the periphery vehicle 2b traveling the same road as that traveled by the subject vehicle 2a (S14 through S17). The narrow area communicator 31 covers a communication range comparable to a radius of approximately several hundreds of meters. Positions or sizes of surrounding buildings or the traffic quantity is similar on the same road in that communication range though positions differ from each other. It is particularly possible to accurately distinguish between the case where the narrow area communicator 31 of the subject vehicle 2a or the periphery vehicle 2b is abnormal and the case where an influence of the communication environment causes an abnormal value from the communication performance index for the narrow area communicator 31 of the subject vehicle 2a or the periphery vehicle 2b by limiting the reference value to the communication performance index received from the periphery vehicle 2b traveling the same road as that traveled by the subject vehicle 2a.

When the narrow area communicator 31 is determined to be abnormal, the wide area communicator 32 is used to notify the center 5 of the vehicle ID of the vehicle 2 including the narrow area communicator 31 determined to be abnormal along with a message signifying that the narrow area communicator 31 is abnormal (S25, S29). The center 5 can thereby recognize that it is impossible to provide an in-vehicle communication service using the narrow area communicator 31 because the narrow area communicator 31 is abnormal. It is possible to take measures to temporarily stop the in-vehicle communication service using the narrow area communicator 31.

<Second Embodiment>

The description below explains the second embodiment. The description of the second embodiment below includes an element assigned the same reference numeral as that used hitherto. Except as otherwise noted, such element equals the element that is assigned the same reference numeral and is described in the above-mentioned embodiment. A configuration may be described only partially. In such a case, the above-mentioned embodiment is applicable to the remaining part of the configuration.

Figure 6:
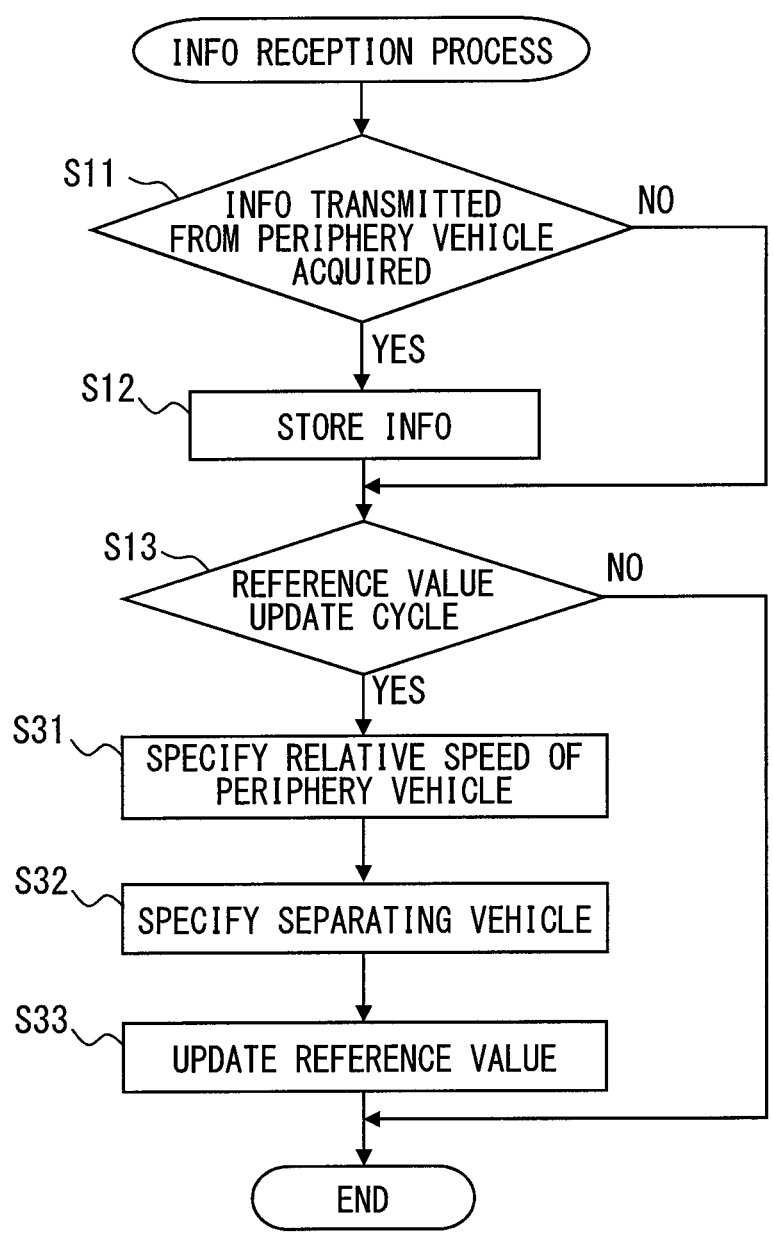
FIG. 6 is a flowchart illustrating an information reception process performed by the controller according to a second embodiment.

In the second embodiment, the controller 37 performs a process illustrated in FIG. 6 in place of the process in FIG. 4. The other part is equal to the first embodiment.

Steps S11 through S13 in FIG. 6 equal steps S11 through S13 in FIG. 4. At step S31, a relative speed of the periphery vehicle 2b in relation to the subject vehicle 2a is specified. Specifically, a chronological change in relative positions of the periphery vehicle 2b around the subject vehicle 2a is specified from the current position of the periphery vehicle 2b and the current position of the periphery vehicle 2a stored in the storage unit 36.

At step S32 as a separation specifier section, it is determined whether the periphery vehicle 2b is the vehicle 2 (hereinafter referred to as a separating vehicle) that is separating away from the subject vehicle 2a. Specifically, the periphery vehicle 2b is assumed to be a separating vehicle when the relative speed specified at step S31 is larger than or equal to a separation speed threshold value. The separation speed threshold value corresponds to a relative speed that is calculated from approximate speed variations during normal driving and is not high enough to specify the periphery vehicle 2b as a separating vehicle. The separation speed threshold value may be provided as a given value (e.g., 30 km/h) or a given percentage (e.g., 50%) of the speed of the subject vehicle 2a.

Figure 7:
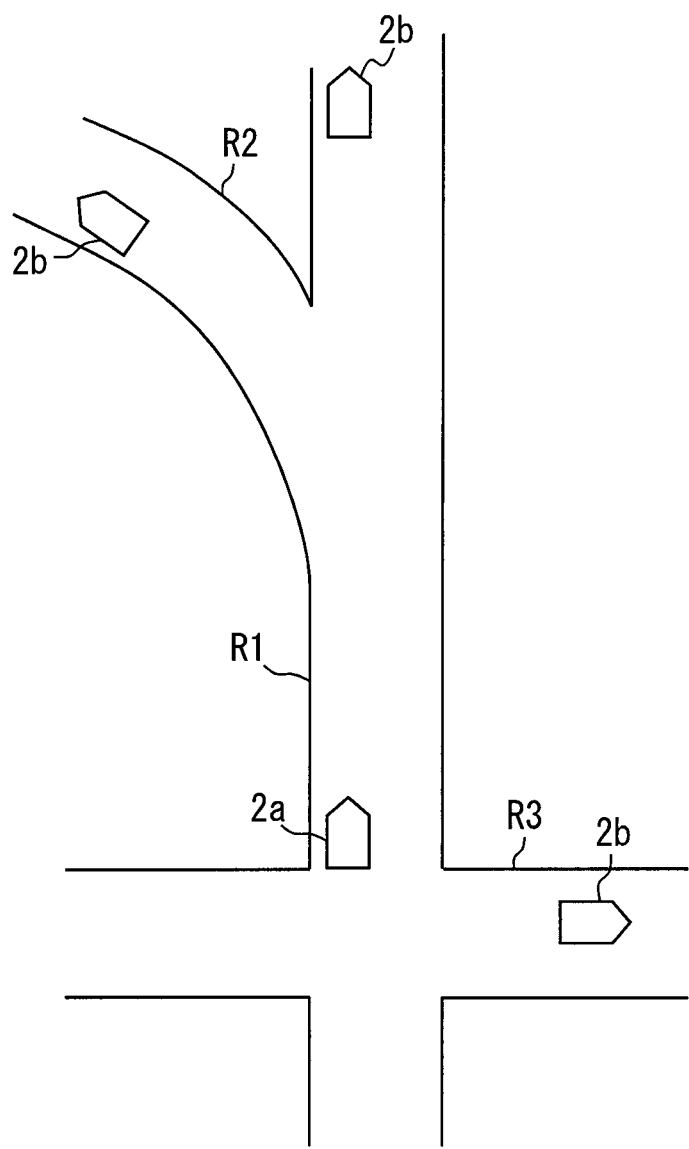
FIG. 7 is a diagram illustrating a separating vehicle specified at step S32 in FIG. 6.

The periphery vehicle 2b is highly likely to cause a high relative speed when the periphery vehicle 2b travels a road different from the road the subject vehicle 2a travels. In FIG. 7, for example, a distance between the subject vehicle 2a and the periphery vehicle 2b traveling road R1 approximates to a distance between the subject vehicle 2a and the periphery vehicle 2b traveling road R2. These periphery vehicles 2b can communicate with the subject vehicle 2a by using the narrow area communicator 31.

Road R2 branches from road R1 traveled by the subject vehicle 2a and extends in a different direction. The periphery vehicle 2b traveling road R2 therefore causes a relative speed to be higher than the periphery vehicle 2b traveling the same road R1 as that traveled by the subject vehicle 2a with reference to the subject vehicle 2a. The periphery vehicle 2b traveling road R3 crossing road R1 also increases a relative speed with reference to the subject vehicle 2a. The periphery vehicle 2b traveling the same road R1 as that traveled by the subject vehicle 2a is therefore unlikely to be specified as a separating vehicle. The periphery vehicles 2b traveling roads R2 and R3 different from the road traveled by the subject vehicle 2a are likely to be specified as separating vehicles.

At step S33, the reference value is updated based on a reference value generation set, namely, the communication performance index acquired by excluding the communication performance index specified at step S32 for the separating vehicle from the most recent communication performance index stored in the periphery vehicle storage area 36b. The same method as the first embodiment may be used to generate a reference value from the reference value generation set. Similarly to the first embodiment, the reference value generation set may include the given number of communication performance indexes or communication performance indexes corresponding to a given time period from the most recent one in addition to the most recent communication performance index.

The number of reference value generation sets may be smaller than the minimum number of reference value generation sets to ensure the reliability of reference values. In such a case, the reference value generation set may be specified with no exception of separating vehicles. Similarly to the first embodiment, the reference value generation set may include the communication performance index for the subject vehicle 2a.

As described in the first embodiment, a different road is likely to cause a different communication environment to the narrow area communicator 31. As described at step S32, the separating vehicle is highly likely to travel a road different from the road the subject vehicle 2a travels.

The second embodiment specifies the reference value by excluding the communication performance index received from the separating vehicle (S33) and can thereby limit the reference value generation set to the communication performance index acquired from the vehicle 2 whose communication environment particularly similar. It is particularly possible to accurately distinguish between the case where the narrow area communicator 31 of the periphery vehicle 2b or the subject vehicle 2a is abnormal and the case where an influence of the communication environment causes an abnormal value from the communication performance index for the narrow area communicator 31 of the periphery vehicle 2b or the subject vehicle 2a.

<First Modification>

The first and second embodiments determine an anomaly on the narrow area communicator 31 of the subject vehicle 2a (S26, S27) and the narrow area communicator 31 of the subject vehicle 2b (S21 through S23). However, anomaly may be determined on one of the narrow area communicator 31 of the subject vehicle 2a and the narrow area communicator 31 of the subject vehicle 2b.

<Second Modification>

In the first and second embodiments, the subject vehicle 2a and the periphery vehicle 2b are mounted with the same in-vehicle device 3. The controller 37 of the in-vehicle device 3 in each of the subject vehicle 2a and the periphery vehicle 2b therefore performs the information transmission process (FIG. 3), the information reception process (FIG. 4), and the anomaly determination process (FIG. 5). However, the subject vehicle 2a need not perform the information transmission process (FIG. 3) so that the in-vehicle device 3 of the subject vehicle 2a determines an anomaly in the narrow area communicator 31 of the subject vehicle 2a and the narrow area communicator 31 of the periphery vehicle 2b. The periphery vehicle 2b need not perform the information reception process (FIG. 4) and the anomaly determination process (FIG. 5). The controller 37 of the in-vehicle device 3 in the subject vehicle 2a therefore need not perform the information transmission process (FIG. 3). The in-vehicle device 3 of the periphery vehicle 2b need not perform the information reception process (FIG. 4) and the anomaly determination process (FIG. 5).

<Third Modification>

The above-mentioned embodiments use the narrow area communicator 31 to transmit the communication performance index, the current position, and the vehicle ID (S5). However, the wide area communicator 32 may be used to transmit the communication performance index and the others. In this case, the wide area communicator 32 receives the communication performance index and the others. The wide area communicator 32 functions as a receiver. The wide area communicator 32, when transmitting and receiving the communication performance index and the others, receives the communication performance index and the others also from the vehicle 2 other than the periphery vehicle 2b. However, the wide area communicator 32 can transmit and receive the communication performance index because the communication performance index from the periphery vehicle 2b can be limited from communication performance indexes received by the wide area communicator 32 based on the current position received along with the communication performance index and the current position of the subject vehicle 2a.

<Fourth Modification>

The position detector 33 may include an acceleration sensor and a gyro sensor in addition to the GNSS receiver so as to be capable of autonomous navigation when an electromagnetic wave is unsatisfactorily received from a positioning satellite.

<Fifth Modification>

The narrow area communicator 31 may cause the roadside device 4 to notify the center 5 that the narrow area communicator 31 of the periphery vehicle 2b is abnormal (S25) in a situation where the narrow area communicator 31 can communicate with the roadside device 4. The narrow area communicator 31 may cause the roadside device 4 to notify the center 5 that the narrow area communicator 31 of the periphery vehicle 2b is abnormal by awaiting a situation where the narrow area communicator 31 can communicate with the roadside device 4. In the fifth modification, the narrow area communicator 31 corresponds to a specified communicator.

<Sixth Modification>

The above-mentioned embodiments cause the targeted narrow area communicator to represent all the narrow area communicators 31 whose reference value generation set includes the communication performance index. This is however limiting. The targeted narrow area communicator may represent the predetermined number of narrow area communicators 31 sequentially from the one nearest to the subject vehicle 2a out of narrow area communicators 31 whose reference value generation set includes the communication performance index.

<Seventh Modification>

The reference value generation set described in the first embodiment may be further limited to the communication performance index transmitted by the periphery vehicle 2b that travels in the same direction as the subject vehicle 2a.

<Eighth Modification>

The controller 37 may include a function as a baseband section that processes baseband signals included in radio waves transmitted and received by the narrow area communicator 31. In this case, the controller 37 specifies the communication performance index.

<Ninth Modification>

The communication performance index need not be transmitted cyclically. The communication performance index may be transmitted at the time when the narrow area communicator 31 starts communication with the roadside device 4, for example.

<Tenth Modification>

In the above-mentioned embodiments, the communication performance index corresponds to one of the RSSI, the average communication rate, the communication success rate, and the number of received error frames. The communication performance index may use two or more of these. In this case, the reference value is also specified for respective communication performance indexes. The reference value is also compared with the communication performance index to determine an anomaly for respective communication performance indexes. The anomaly determination performed for respective communication performance indexes may result in the given number of communication performance indexes that satisfy an anomaly determination condition. The narrow area communicator 31 corresponding to the communication performance indexes is then determined to be abnormal.

The embodiment is not limited to the above-mentioned embodiments but may be variously modified. The scope of embodiments related to the present disclosure also includes an embodiment resulting from appropriately combining technical portions disclosed in different embodiments.

The invention claimed is:

1. A vehicular communication device used for a vehicle, comprising:
a reception section that receives, from a periphery vehicle equipped with a narrow area communicator, a communication performance index representing performance of the narrow area communicator;
a processor configured to
successively settle a reference value as a criterion for the communication performance index based on the communication performance indexes received by the reception section from a plurality of the periphery vehicles;
acquire the communication performance index for a targeted narrow area communicator, wherein the targeted narrow area communicator is the narrow area communicator targeted at anomaly determination;
determine an anomaly of the targeted narrow area communicator based on a comparison between the reference value settled by the processor and the communication performance index acquired by the processor for the targeted narrow area communicator; and
send a notification to a center of the anomaly of the targeted narrow area communicator;
wherein the center stops an in-vehicle communication service using the targeted narrow area communicator in response to the notification of the anomaly of the targeted narrow area communicator.

2. The vehicular communication device according to claim 1, wherein:
the processor is configured to acquire, as the communication performance index for the targeted narrow area communicator, any of the communication performance indexes acquired by the reception section from the plurality of periphery vehicles.

3. The vehicular communication device according to claim 2, wherein:
the processor is further configured to use, when the processor determines that the targeted narrow area communicator is abnormal, a specified communicator to notify the center that the narrow area communicator of the periphery vehicle serving as the targeted narrow area communicator is abnormal.

4. The vehicular communication device according to claim 1, wherein:
the vehicular communication device includes the narrow area communicator; and
the processor is further configured to acquire, as the communication performance index for the targeted narrow area communicator, the communication performance index for the narrow area communicator included in the same vehicular communication device as the processor.

5. The vehicular communication device according to claim 4, further comprising:
a wide area communicator that communicates with the center via a communication network;

wherein the processor is further configured to use, when the processor determines that the targeted narrow area communicator is abnormal, the wide area communicator to notify the center that the narrow area communicator of a subject vehicle, which is the vehicle using the targeted narrow area communicator, is abnormal.

6. The vehicular communication device according to claim 1 wherein:
the reception section includes an altitude detector that receives the communication performance index and an altitude of the periphery vehicle transmitting the communication performance index and detects an altitude of a subject vehicle, which is the vehicle using the vehicular communication device; and
the processor is further configured to successively settle the reference value by using, out of the communication performance indexes acquired along with the altitudes by the reception section from the plurality of periphery vehicles, the communication performance index along with the altitude whose difference from the altitude of the subject vehicle detected by the altitude detector is within an approximate altitude.

7. The vehicular communication device according to claim 1, wherein:
the reception section includes:
a subject vehicle position specifier that receives the communication performance index and a position of the periphery vehicle transmitting the communication performance index and specifies a position of a subject vehicle, which is the vehicle using the vehicular communication device;
the processor is further configured to determine, for each periphery vehicle from which the communication performance index is received, whether the subject vehicle and the periphery vehicle travel the same road, based on the position of the periphery vehicle received by the reception section and the position of the subject vehicle specified by the subject vehicle position specifier; and
the processor is further configured to successively settle the reference value based on, out of the communication performance indexes acquired by the reception section from the plurality of the periphery vehicles, the communication performance index acquired from the periphery vehicle that is determined as traveling the same road as the subject vehicle by the processor.

8. The vehicular communication device according to claim 1, wherein:
the reception section includes:
a subject vehicle position specifier that receives the communication performance index and a position of the periphery vehicle transmitting the communication performance index and specifies a position of a subject vehicle, which is the vehicle using the vehicular communication device;
the processor is further configured to determine, for each periphery vehicle from which the communication performance index is received, whether the periphery vehicle is separating away from the subject vehicle, based on the position of the periphery vehicle received by the reception section and the position of the subject vehicle specified by the subject vehicle position specifier; and
the processor is further configured to successively settle the reference value by excluding, out of the communication performance indexes acquired by the reception section from the plurality of periphery vehicles, the communication performance index acquired from the periphery vehicle that is determined as separating away from the subject vehicle by the processor.

* * * * *